(12) United States Patent
Pichaimurthy et al.

(10) Patent No.: US 11,750,859 B2
(45) Date of Patent: Sep. 5, 2023

(54) METHODS AND SYSTEMS FOR SEPARATE DELIVERY OF SEGMENTS OF CONTENT ITEMS

(71) Applicant: Rovi Guides, Inc., San Jose, CA (US)

(72) Inventors: Rajendran Pichaimurthy, Karnataka (IN); Prakash Viswanathan, Karnataka (IN); Dolphin Masilamany Santha, Karnataka (IN); Madhusudhan Seetharam, Bangalore (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/485,796

(22) Filed: Sep. 27, 2021

(65) Prior Publication Data

US 2023/0096176 A1 Mar. 30, 2023

(51) Int. Cl.
| | |
|---|---|
| H04N 7/167 | (2011.01) |
| H04N 21/2389 | (2011.01) |
| H04N 21/239 | (2011.01) |
| H04N 21/61 | (2011.01) |
| H04N 21/845 | (2011.01) |
| H04N 21/6405 | (2011.01) |

(52) U.S. Cl.
CPC ... *H04N 21/23895* (2013.01); *H04N 21/2393* (2013.01); *H04N 21/6131* (2013.01); *H04N 21/6405* (2013.01); *H04N 21/8456* (2013.01)

(58) Field of Classification Search
CPC ......... H04N 21/23895; H04N 21/2393; H04N 21/6131; H04N 21/6405; H04N 21/8456
See application file for complete search history.

(56) References Cited

U.S. PATENT DOCUMENTS

| | | | |
|---|---|---|---|
| 7,761,892 B2 | 7/2010 | Ellis et al. | |
| 2005/0081244 A1* | 4/2005 | Barrett | H04L 12/185 |
| | | | 725/38 |
| 2006/0280173 A1* | 12/2006 | Nilsson | H04N 21/2662 |
| | | | 375/240 |
| 2007/0061831 A1 | 3/2007 | Savoor et al. | |
| 2007/0192812 A1* | 8/2007 | Pickens | H04L 1/1812 |
| | | | 348/E7.071 |
| 2007/0244982 A1 | 10/2007 | Scott et al. | |
| 2008/0031448 A1* | 2/2008 | Dang | H04N 7/1675 |
| | | | 348/E7.056 |

(Continued)

OTHER PUBLICATIONS

U.S. Appl. No. 17/485,832, filed Sep. 27, 2021, Rajendran Pichaimurthy.

*Primary Examiner* — Gigi L Dubasky
(74) *Attorney, Agent, or Firm* — HALEY GUILIANO LLP

(57) ABSTRACT

Systems and methods are described herein for transmitting a content item to a user device using multiple delivery protocols. The system receives, at a content source, a request for the content item from the user device. The system splits a digital stream of the content item into a first video signal and a second video signal. The system then transmits, via a unicast server, the first video signal for the content item to the user device, and transmits, via a multicast server, the second video signal for the content item to the user device. The system then causes for presentation on the user device the first video signal followed by the second video signal. In other embodiments, the system is optimized between the unicast delivery of a content item and a peer-to-peer delivery.

20 Claims, 9 Drawing Sheets

(56) References Cited

U.S. PATENT DOCUMENTS

| | | | |
|---|---|---|---|
| 2009/0168679 A1* | 7/2009 | Benjamim | H04N 21/6405 |
| | | | 370/312 |
| 2011/0058607 A1* | 3/2011 | Zhao | H04N 19/166 |
| | | | 375/E7.243 |
| 2011/0134808 A1* | 6/2011 | Thyni | H04L 65/611 |
| | | | 370/270 |
| 2013/0144988 A1* | 6/2013 | Tan | H04L 67/10 |
| | | | 709/219 |
| 2013/0290555 A1 | 10/2013 | Einarsson et al. | |
| 2015/0030022 A1 | 1/2015 | Mantin | |
| 2016/0029050 A1 | 1/2016 | Thornburgh | |
| 2016/0150295 A1 | 5/2016 | Goziker et al. | |
| 2017/0013296 A1* | 1/2017 | Millar | H04N 21/6408 |
| 2017/0019439 A1* | 1/2017 | Kim | H04L 65/612 |
| 2017/0353768 A1 | 12/2017 | Muvavarirwa | |

\* cited by examiner

METHODS AND SYSTEMS FOR SEPARATE DELIVERY OF SEGMENTS OF CONTENT ITEMS

BACKGROUND

The present disclosure relates to methods and systems for delivering a content item to a user device and, more particularly, to methods and systems for delivering a content item to a user device via a unicast platform and a multicast platform. In another example, the present disclosure is directed to methods and systems for delivering segments of a content item using a unicast platform and delivering segments of a content item using a peer-to-peer transmission.

SUMMARY

A variety of media content delivery mechanisms are available. An increasing percentage of subscribers receive media content through a streaming server, a content delivery network (CDN) or an Internet protocol-based TV as an alternative way to provide media content to the subscribers. A CDN breaks down the media content into smaller downloadable HTTP files and delivers them using the HTTP protocol or HTTP Live Streaming (HLS). Delivering the media content to the consumer via the server creates bottlenecks at the server level due to a large volume of content being transmitted and a large number of consumers, each requiring a digital rights management (DRM) key, to receiving the media content. Some of the delivery options are a unicast delivery (e.g., transmission control protocol (TCP)) or multicast delivery (e.g., User Datagram Protocol (UDP)). A unicast delivery is an individual delivery, from the server to the consumer, where all the frames of the media content including the DRM key are delivered. However, such intensive transmission of data causes delay and lag in delivery of media content based on servers reaching bandwidth capacity. In a multicast delivery, the servers deliver media content to multiple consumers at the same time, thereby reducing the bandwidth capacity, however, multicast delivery is limited in encryption and may only transmit a single DRM key for all consumers.

In all of these delivery scenarios, however, the ability to deliver media content to consumers is not without its difficulties. A unicast delivery platform (e.g., TCP) introduces a lot of overhead to the network since it requires a handshake, positive acknowledgment and/or retransmission of missed data, etc., so that a unicast (e.g., TCP) device can pass the data to the proper application on the client-side. While on the other side, a multicast delivery platform (e.g., multicast delivery platform (UDP)) doesn't employ the various mechanisms that a unicast delivery platform (e.g., TCP) employs and is considered a lightweight protocol and can be used for multimedia streaming. However, client-based provided services currently do not provide a system where both delivery platforms are used to deliver a media asset with an encryption DRM key. In delivering a media asset multicast and unicast delivery platforms both have a variety of benefits and drawbacks, and consequently, both are used in different environments. However, mechanisms for allowing effective switching between multicast and unicast delivery mechanisms are limited. Consequently, systems and methods are needed to improve the efficiency of delivery servers of media content by switching between unicast and multicast delivery mechanisms.

To overcome these problems, a delivery system including multicast and unicast delivery mechanisms that permits switching between unicast and multicast data is described. In some embodiments, systems and methods are described for transmitting a content item to a user device. In some examples, the delivery system involves delivering data to client devices partially using unicast communication and partially using multicast communication. The system includes components such as a demuxer, which is a component (e.g., software) that analyzes the digital stream and separates it into various portions. For example, the system separates the media content into streams with intraframe (I-frame) segments and non-intraframe (non-I-frame) segments. In some embodiments, the unicast server transmits the I-frame segments to a client device via a unicast delivery mechanism, while the client device can otherwise receive the non-intraframes from the multicast server via a multicast delivery mechanism. In such a configuration, the unicast server transmits the I-frame segments along with the DRM key encryptions. The non-I-frame segments are transmitted via a multicast server and are provided to follow the presented I-frame on the display. Such a system may be used to improve the efficiency of live media streaming, both in terms of load on servers transmitting I-frame segments and servers transmitting non-I-frame segments. Further, the system improves the security of the delivery and also reduces the network congestion using a multicast delivery mechanism.

In accordance with some embodiments, a delivery system including multicast and unicast delivery mechanisms that permits switching between unicast and multicast data is described. In some embodiments, a system and methods are described for transmitting a content item to a user device. In some examples, the delivery system involves delivering data to client devices partially using unicast communication and partially using peer-to-peer multicast communication. The system demultiplexes the digital stream, separates it into various segments and identifies transmission servers within proximity of the client device that has received the second video signal of the content item. In some embodiments, the unicast server transmits the I-frame segments to a client device via a unicast delivery mechanism, while the client device can otherwise receive the non-intraframes from a peer-to-peer transmission of the local server via a multicast delivery mechanism or a unicast delivery mechanism. In such a configuration, the unicast server transmits the I-frame segments along with the DRM key encryptions. The non-I-frame segments are transmitted from transmission servers within a proximity of the client device via a multicast/unicast mechanism. Such a system may be used to improve the efficiency of live and on-demand media streaming, in terms of both load on servers transmitting I-frame segments and using servers within proximity to the consumer device.

In some embodiments, methods and systems are disclosed for transmitting a content item to a user device. The system receives, at a content source, a request for the content item from the user device—for example, the consumer request to view a live program or an on-demand program. The system splits, using a demultiplexer, a digital stream into a first video signal of the content item and a second video signal of the content item. For example, the system splits the stream into the first video signal, which includes intraframe segments of the content item and the second video signal, which includes non-intraframe segments of the content item. The system transmits the first video signal for the content item to the user device via a unicast server. The system then sends, via a multicast server, the second video signal for the content item to the user device. The system generates the first video signal for presentation on the user device, followed by the second video signal.

In some embodiments, methods and systems are disclosed herein to dynamically optimize the delivery of a content item to a user device. For example, the system may monitor the load on the transmitting server and optimize the transmission to the user device based on said load. During off-peak hours, the transmission may be exclusively unicast from the server; however, during busy periods, only partial segments including the I-frames may be unicast to the consumer device, and the remaining segments may be transmitted via a multicast server or a peer-to-peer transmission server. In some embodiments, the system receives, at a content source, a request for the content item from the user device—for example, the consumer request to view a live program or an on-demand program. The system splits, using a demultiplexer, a digital stream into a first video signal of the content item and a second video signal of the content item. For example, the system splits the stream into the first video signal, which includes intraframe segments of the content item, and the second video signal, which includes non-intraframe segments of the content item. The system transmits, via a unicast server, the first video signal for the content item to initiate a presentation of the content item on the user device. The system identifies transmission servers within a proximity of the user device that have received the second video signal of the content item. The system transmits metadata of the transmission servers within the proximity of the user device to the user device. The user device receives, from the transmission servers within the proximity of the user device, the second video signal for the content item to generate for presentation of the content item on the user device. The system generates, for presentation on the user device, the first video signal followed by the second video signal.

In some embodiments, transmitting the first video signal for the content item comprises transmitting the first video signal encrypted with a DRM key for the content item. In some embodiments, transmitting the second video signal for the content item comprises transmitting an unencrypted second video signal for the content item.

In some embodiments, generating for presentation on the user device, the first video signal followed by the second video signal is performed by switching from generating for presentation the first video signal to the second video signal on the user device. In some embodiments, generating for presentation on the user device the first video signal followed by the second video signal is performed by switching between receiving the content item from the unicast server to receiving the content item from the multicast server. In some embodiments, the system switches between receiving the content item from the unicast server to receiving the content item from the multicast server by determining that the multicast server is available at the user device. The system then receives, at the user device, the first video signal via the unicast server. Based on receiving the first video signal via the unicast server, the system transmits, to the user device, the second video signal from the multicast server. In some embodiments, the system determines that the multicast server is available by determining that the multicast server is at least one of a number of available multicast servers and by determining the available bandwidth for each server. For example, the system monitors the available servers and transmits the information to the user device in response to available capacity.

In some embodiments, the system transmits the first video signal as a unicast over-the-top (OTT) stream to the user device over the cellular network or another network. In some embodiments, the system sends the second video signal as a multicast OTT stream to the user device over the cellular network or another network. In some embodiments, the second video signal for the content item is cached at a content distribution network (CDN) for transmission via the multicast server.

It should be noted that the systems, methods, apparatuses, and/or aspects described above may be applied to or used in accordance with other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
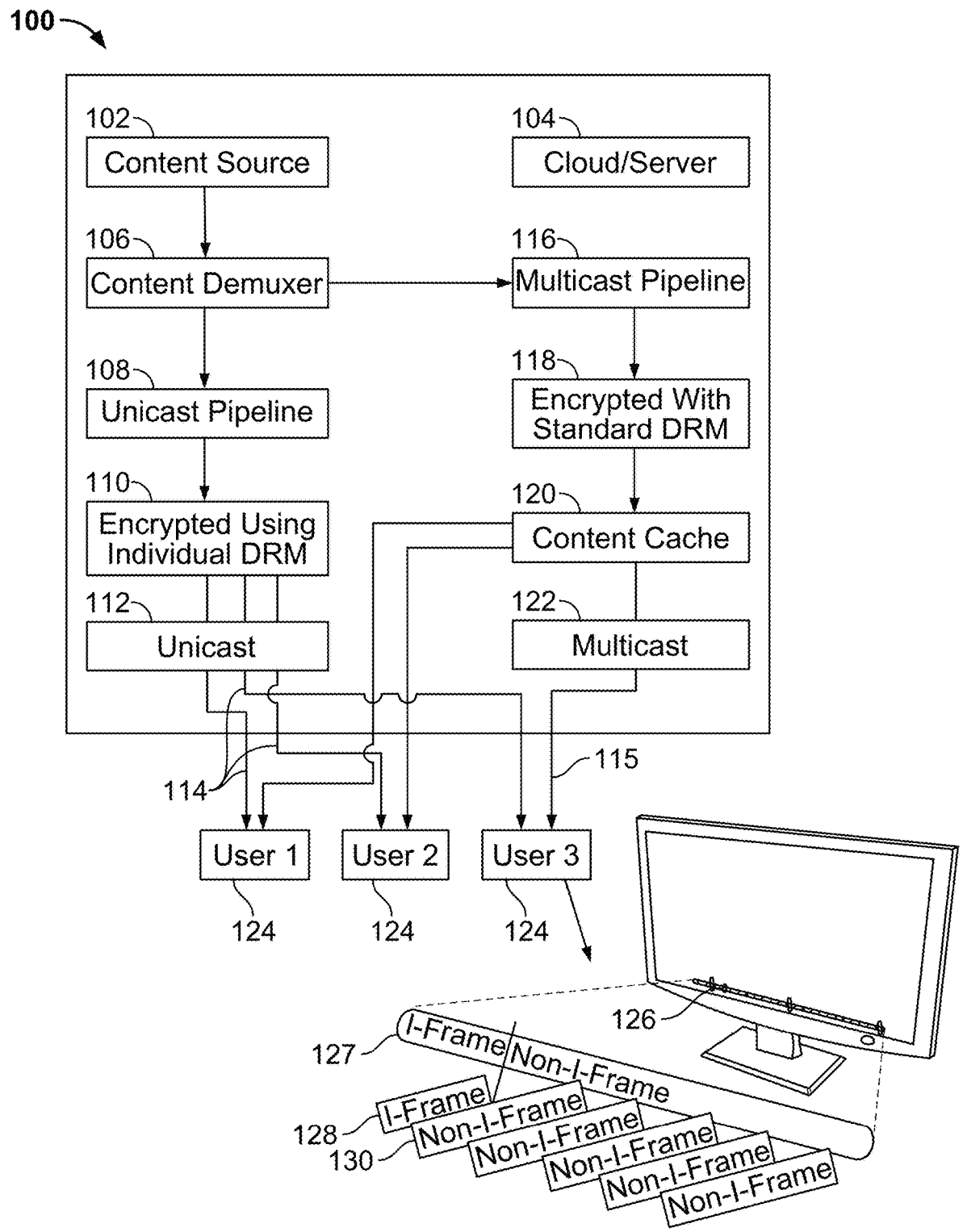
FIG. 1 shows an exemplary scenario 100 in which a media asset is demuxed and delivered via multiple delivery protocols, in accordance with some embodiments of the disclosure.

FIG. 1 shows an exemplary scenario 100 in which a media asset is demultiplexed and delivered via multiple delivery protocols to a user device, in accordance with some embodiments of the disclosure. FIG. 1 illustrates one example of a system that can be used with various techniques and mechanisms of the present invention. In accordance with various embodiments, the system shown in FIG. 1 may be used to facilitate the distribution of content item segments via unicast and multicast mechanisms. Content item segments may be created in and/or transmitted from the content source 102, in a live or on-demand format, and distributed to the unicast server 112 as well as a multicast server 122 for transmission to the user 124 and their display device 126.

As part of creating the content item, the system at the cloud/server performs an analysis using a content demuxer 106, separates the multiple streams into a unicast and multicast transmission, performs unicast encryption 110 and multicast encryption 118 and transmits the content segments to the user/client 124 via the respective mechanisms (e.g., unicast 112, multicast 122). The content demuxer 106 performs an analysis on the content item to distinguish between intraframes and non-intraframes. The content demuxer or demultiplexer 106 is an equipment (e.g., software) that analyzes the digital stream and separates it into various components, e.g., intraframes and non-intraframes. Intraframes are frames of a content item that initiate as the starting point in the content item, while non-intraframes are frames of a segment that follow the intraframe and change the intraframe. In some embodiments, the non-intraframes update the intraframe as presented on the device 126. The unicast server transmits the intraframe to the user device and may be cached at the user device, while the multicast server transmits the non-intraframes. Each user device that subscribes and possess the appropriate DRM key (e.g., subscription to Netflix, Hulu, etc.) for the content item may receive the I-frame and store the I-frame until a subsequent I-frame is received and receive the non-I-frame segments between the received I-frames. In some embodiments, the content cache 120 stores portions of the non-intraframe content on the server for quickly delivering to the user upon request.

A user device 126 at the client-side 124 may receive content from the unicast server 112, via a communication network 114, as well as the multicast server 122, via a communication network 115. In different periods of time or in different locations, one server may be more bandwidth-constricted; more limited in providing a DRM key; or more desirable than another server depending on factors such as the accessibility of the different servers, the cost of receiving data from the different servers and/or the latency associated with communicating with the different servers. The user device includes a buffer, a unicast and a multicast receiver, a display 126, and a decoder 127. For example, the user device 126 may be used to present the content received from the content source 102 and may be a phone, a cell phone, a smartphone, a tablet, a laptop computer, a desktop computer, or any other device capable of presenting content for consumption, whether live, recorded or streamed over the Internet.

The decoder 127 may be a control processor on the user device configured to receive the intraframes and the non-intraframes and collate them together for a seamless presentation of the content item. The buffer may be a storage device on the user device or another device communicatively connected to the user device and configured to store received intraframes and non-intraframes received via unicast and multicast mechanisms.

A content source 102 may be any distribution client of media assets. In accordance with various embodiments, the content source 102 may be operable to provide data representing a live-content item or on-demand content item for presentation at a client device, which is also referred to herein as a user device 126. The data representing the media item may be provided to the client device as a media stream. The client device may be operable to present the content item in real time for consumption by a user 124. The content source 102 may be a live-content provider, a content distributor, or any other source of content.

In some embodiments, the media stream may be separated into a plurality of media stream fragments, as is discussed herein. The media stream fragments may be created in sequential order or in any other order. In accordance with various embodiments, a media stream may include various types of information. For example, a media stream may include one or more audio tracks, video tracks, closed captioning information, video subtitles, pictures, or picture albums. As another example, a media stream may include one or more uniform resource locators or other mechanisms for locating or accessing content.

The system includes a unicast pipeline 108. In accordance with various embodiments, the unicast pipeline 108 may communicate with client devices via one or more unicast transport types. For example, the unicast server may communicate with client devices via HTTP. In accordance with various embodiments, techniques described herein may be used in conjunction with various types of unicast transmission technology, such as TCP, HSPA, CDMA2000, LTE, LTE Advanced, and variants of IEEE 802.11.

In some embodiments, the unicast pipeline 108 may receive the media stream segments from the content source 102. The media stream segments may be stored at the unicast server 108. Then, the media stream segments may be transmitted to the client device upon request. At the unicast server 108 or downstream from the unicast server, the system may encrypt the unicast video signal with an individual DRM key at 110. For example, the system attaches a subscription key unique to the user to the video signal.

The system further includes a multicast pipeline 116. In accordance with various embodiments, techniques described herein may be used in conjunction with various types of multicast technology using streams or files for transmission, such as user datagram protocol (UDP). As another example, the multicast server may be configured to transmit information via messages in accordance with the multimedia broadcast multicast services (MBMS) specification. At the multicast pipeline 116 or downstream from the multicast server, the system may encrypt the multicast video signal with a general DRM key at 118. For example, the system attaches a generic subscription key for a group or geographic area to the video signal.

The user device 126 is shown receiving content via the unicast communication network 114 and multicast communication network 115. In either case, the user device may store the received video signals in the media stream fragment buffer. These fragments may then be decoded by the decoder and displayed via the user device 126.

In some embodiments, the content item video signal fragment buffer may store media fragments received from the unicast server 108 and/or the multicast server 116. The video signal fragments may be cached at the user device even before they have been transmitted for decoding and presentation via the device 126. Alternately, fragments may continue to be stored in the buffer after they have been decoded for presentation. The unicast communication network 114 may be configured to transmit, receive, and process communications with the unicast server 108 and individual user device 126. The multicast communication network 115 may be configured to transmit, receive, and process communications with the multicast server 116 and multiple user 124 each associated with a user device 126. Both communication network the unicast communication and the multicast communication, may be HTTP agents configured to communicate via the HTTP Live Streaming (HLS) protocol.

In some embodiments, when the unicast reception of content item segments is ahead of the multicast session, it is easy to switch from unicast to multicast reception without missing media stream segments in the display. For example, if the client is in the state where a first frame (I-frame) referred to "n" video signal segment is received at the user device, and, it already has the currently multicast video signal segment n+1 in the buffer. The next multicast segment, which is video signal segment n+2, will be fully received, and an uninterrupted sequence of segments will be in the buffer.

A transition from unicast to multicast may happen seamlessly; for example, the client device presents the intraframe and transitions to the non-intraframe segments. On the other hand, when the client device needs to verify that DRM key, a transition from multicast to unicast may occur abruptly. Multicast to unicast switching may be handled without interruption, provided that the network conditions are sufficient. To avoid an interruption when going back to multicast mode later on, the client may fetch additional segments via unicast to get ahead of the multicast transmission.

In some embodiments, systems may be configured to support the interaction of the user device. These operations may in some embodiments be accomplished through the use of the following feedback APIs: the reception strengths for a multicast and/or unicast network; an identifier corresponding to the most recent segment received by the user device; an identifier corresponding to the most recent segment played by the user device; a value corresponding to active transport and/or events when transport changes; a value corresponding to an active template and/or events when a template changes; a value corresponding to the available bandwidth; or metadata information (e.g., files transferred between the servers and the user data alongside segments that provide program information that can be synchronized with the playing video.)

In particular embodiments, in order to facilitate the appropriate synchronization of the unicast I-frame and multicast non-I-frames, the client clock may be synchronized with the segment generator clock. Then, the download of segments may be controlled by the latest manifest file, which provides enough information to programmatically generate segment URLs, and one or more values specified in the manifest file, such as the availability start time.

In some embodiments, the system may be configured to stream a content item using multiple different protocols. In some embodiments, a streaming session is transitioned from a server (e.g., a unicast server 108) that supports HTTP-based delivery to a server that supports a different protocol, such as secure reliable transport (SRT) where user datagram protocol (UDP) (e.g., multicast server) is relied on for content item transmission. As such, dedicated servers may be deployed by the delivery network or CDN, and they can be used during peak times and to support a group of users that experience a low quality experience. In some embodiments, the streams are replicated to feed the dedicated servers that stream content via a different protocol—since such streams do not need to be repackaged (e.g., to support DASH or HLS). The streams are duplicated when it is detected that some clients will be switched over to servers that support a different transport protocol.

The QoE service monitors the player's buffer and initiates a switch or transition when the buffer is full. The QoE service can instruct the player to cease utilizing an existing manifest (e.g., in the case of VOD where the player has the full manifest associated with the content item) or instruct the HTTP streaming server to stop sending updated manifests (e.g., when the client is streaming live content) in order to initiate a successful transition. In some embodiments, the QoE service receives a sequence of the I-frame and non-I-frame segments from the user device. In some embodiments, the QoE service receives messages associated with each segment as they are presented on the user device. Based on the received messages, the QoE service may receive out-of-order messages that indicate that the server is behind the delivery of the media asset. In some embodiments, a client device may transmit the number of out-of-order messages to the QoE service. In some embodiments, a client device may retransmit a request for non-I-frame segments based on the number of out-of-order messages from the QoE service. The last segment available at the player (e.g., in the buffer) is used to indicate to the new server where to resume streaming content from. Such information can be exchanged between the servers or communicated via the QoE service that resides in between. The QoE server might determine to transition the streaming session of a whole group (e.g., 100 clients) to the new streaming server that supports a different transport protocol based on their reported playback metrics.

The server device 202 and client device 208 may be connected via a communication network, as described below. Each of the server device 202 and client device 208 may comprise control circuitry for performing any of the steps, actions, and/or processes described herein. The server device 202 may further include transcoding circuitry, which may be part of the control circuitry, or may be a separate module. The transcoding circuitry may be implemented in hardware, firmware, or software. The client device 202 may further include a display and speaker modules for playback of transcoded media.

Figure 2:
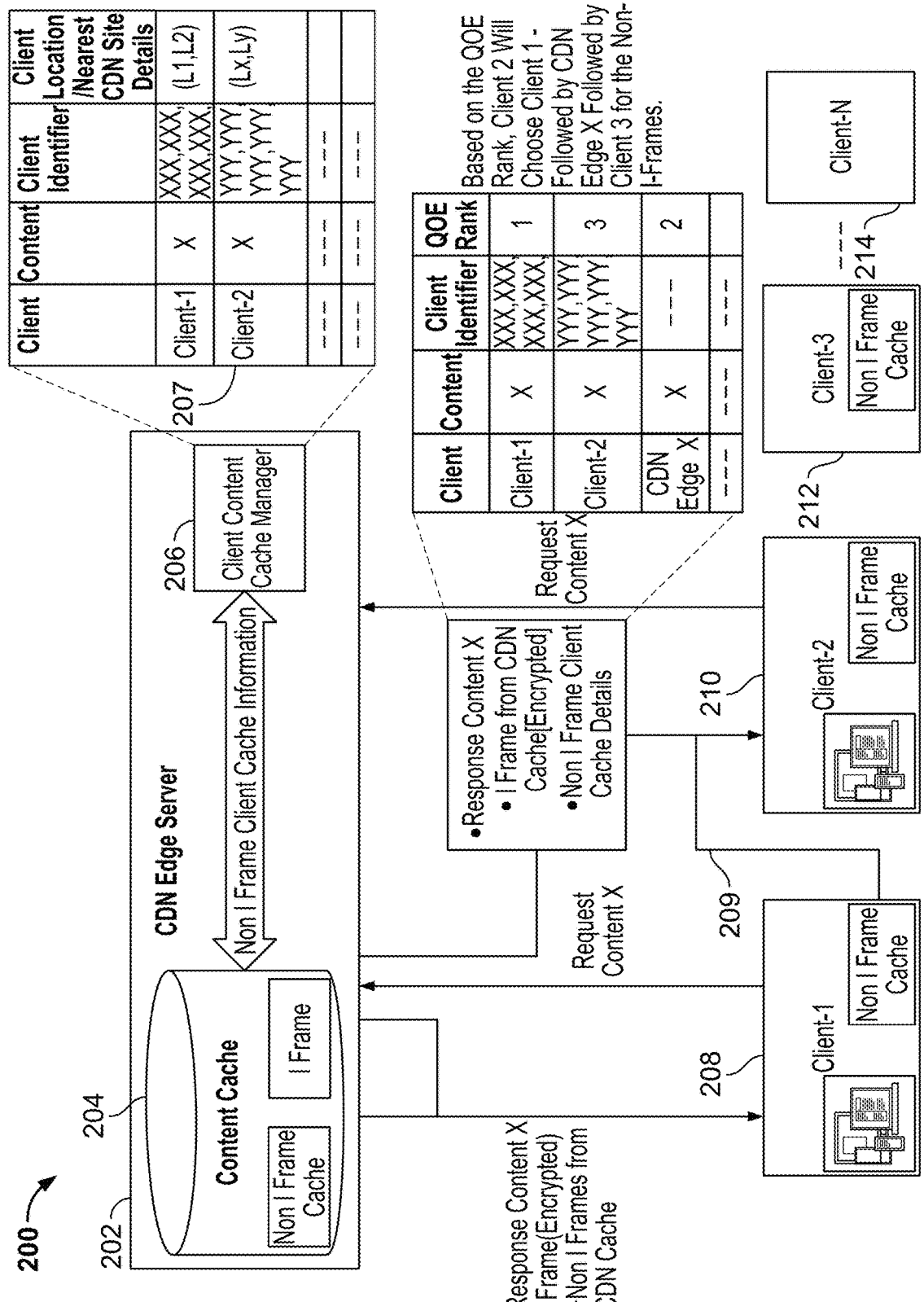
FIG. 2 shows an exemplary illustrative system scenario 200 in which a media asset is demuxed and delivered, the first stream via a unicast delivery mechanism and a second stream via a peer-to-peer delivery mechanism, in accordance with some embodiments of the disclosure.

FIG. 2 shows an exemplary illustrative system scenario 200 where a media asset is demuxed and delivered, the first stream via a unicast delivery mechanism and a second stream via a peer-to-peer delivery mechanism, in accordance with some embodiments of the disclosure. FIG. 2 shows a CDN edge server that monitors content items as they are delivered to client devices. The CDN edge server includes a content cache 204 that may store the non-I-frame cache and I-Frame cache. The CDN edge server also includes a database managed by the client content cache manager 206, which tracks which client has received which content item, including the metadata 207 associated with the client.

In an exemplary scenario, client 1 208 requests a content item from the CDN edge server 202. The CDN edge server transmits from the content cache the I-frame (encrypted with DRM) and non-I-frames to the user device at client 1 208. Subsequent to client 1 208 receiving the content item, the client 2 request a similar content item. The client content cache manager identifies the metadata associated with client 1, who already received the content item. The CDN edge server transmits from the content cache the I-frame (encrypted with DRM), and client 1 transmits the non-I-frames to the user device at client 2 210 via a network communication 209 between client 1 and client 2. The client for transmission of the non-I-frame content item may be identified based on the proximity, bandwidth capacity, an established relationship, or a combination thereof.

Figure 3:
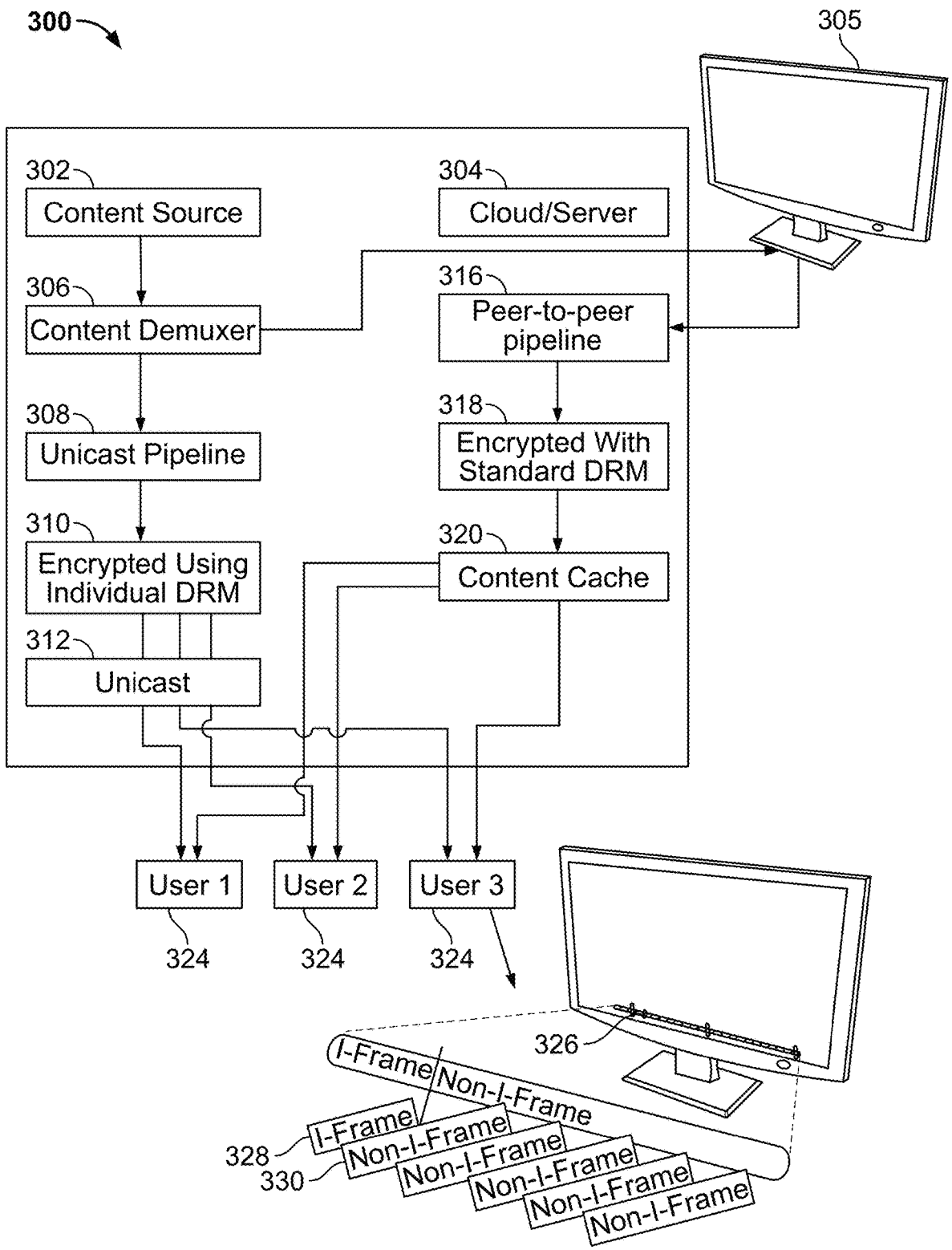
FIG. 3 shows an exemplary scenario 300 in which a media asset is demuxed and delivered, the first stream via a unicast delivery mechanism and a second stream via a peer-to-peer delivery mechanism, in accordance with some embodiments of the disclosure.

FIG. 3 shows an exemplary scenario 300 in which a media asset is demultiplexed and delivered, the first stream via a unicast delivery mechanism and a second stream via a peer-to-peer delivery mechanism, in accordance with some embodiments of the disclosure. FIG. 3 illustrates one example of a system that can be used with various techniques and mechanisms of the present invention. In accordance with various embodiments, the system shown in FIG. 3 may be used to facilitate the distribution of content item segments via unicast between a server and client and unicast or multicast mechanisms between multiple client devices. Content item segments may be created in and/or transmitted from the content source 302, in live or on-demand format, and distributed to the unicast server 312 as well as a first client device 305, that can subsequently transmit the content via peer-to-peer pipeline 316 for transmission to the user 324 and their respective display device 326. Some of the steps of transmission of the content item pertaining to unilateral transmission from the server to the client are similar to those described above in connection with FIG. 1.

In some embodiments, different protocols are used to stream different portions of a segment (e.g., I-frame and non-I-frame). For example, the client receives an encryption I-frame from a media server (e.g., unicast pipeline 308) via an HTTP-based protocol (e.g., HLS) and retrieves the remainder of the segments from a peer via Web Real-Time Communication (WebRTC) (peer-to-peer pipeline 316).

In some embodiments, the WebRTC (peer-to-peer pipeline 316) framework is used in conjunction with an HTTP-based streaming protocol (e.g., DASH, HLS) for multimedia streaming to enable peer-to-peer streaming for at least a portion of a content stream/content item. For example, at least for a portion of a content item (e.g., a popular movie that was added to a streaming service and is being streamed by a large number of subscribers), an encrypted I-frame associated with a segment (e.g., 6 seconds) is sent from the streaming server to a streaming client (or an I-frame manifest/playlist is sent) along with additional information (e.g., an IP address, URL, etc.) of a peer to retrieve the remaining portion of the segment from. For example, WebRTC is used to establish peer-to-peer connections between the clients to exchange streams. Such connections are established (e.g., set up) before the client starts receiving references (e.g., URLs) to content that is distributed between the server and other clients. This ensures that a session has been established between the two clients and they can exchange the remaining portion of the segment. Such connections can dynamically be created and dismantled as the characteristics of the network change (e.g., congestion is reduced, load on the streaming server is reduced due to clients ending a streaming session, clients move to a different location, etc.). In some embodiments, the system may optimize as to which server receives the segments of the content item by monitoring the load at each server and adjusting based on load nearing a threshold. A cloud-based controller is responsible for monitoring the network conditions as well as keeping track of the clients that are consuming the same content; their progress within the content (e.g., content could be a video-on-demand (VOD) movie where one client is 10 minutes into the movie, while another is 11 minutes into the movie); and their buffer levels (e.g., buffer thresholds, such as low, medium, high, could be reported to the controller), in order to pair clients with each other, when possible.

In some embodiments, the player utilizes the manifest file that includes references (e.g., URLs) to the various segments, and in response to making an HTTP GET request for a certain segment, the server sends the first I-frame associated with the particular segment and additional information to enable the player to retrieve the remaining portion of the segment from a peer client. The additional information could be sent as an XML or JSON file with metadata to enable the player to automatically construct a call to the peer. In this particular embodiment, metadata does not describe the content (i.e., genre, actor, etc.) but rather gives the player information regarding how to fetch the remaining portion of the segment, e.g., by identifying a specific peer from a list of peers that the client can request the content from. For example, the client might have fetched various segments during a video session from Peers A, B, and C, and at a given point, the metadata might indicate that the content should be fetched from Peer C.

In some embodiments, peers on a cellular connection (e.g., LTE) might only be able to download (retrieve) segments from peers on Wi-Fi connection, since such peers could be constrained to data caps. However, the controller or tracker (one or more servers that keep track of peers streaming the same content in order to coordinate peer connections) also monitors when clients switch from cellular connections to Wi-Fi connections and vice versa. This will allow the tracker server to dynamically re-allocate and pair multiple peers with each other—and the tracker has the option to revert any peer to the classic client/server architecture (where the peers retrieve the full segment directly from the server).

In some embodiments, player analytics are also reported to the tracker service, and that includes CPU utilization on the peer and number of frames dropped. Such information can be an indication that a particular peer may not have enough resources to support uploading content to other peers. Such peers can be placed on a waiting list and placed back into a pool of peers that support upload/download of segments from other peers when the player reports improved metrics for a predetermined time.

Figure 4:
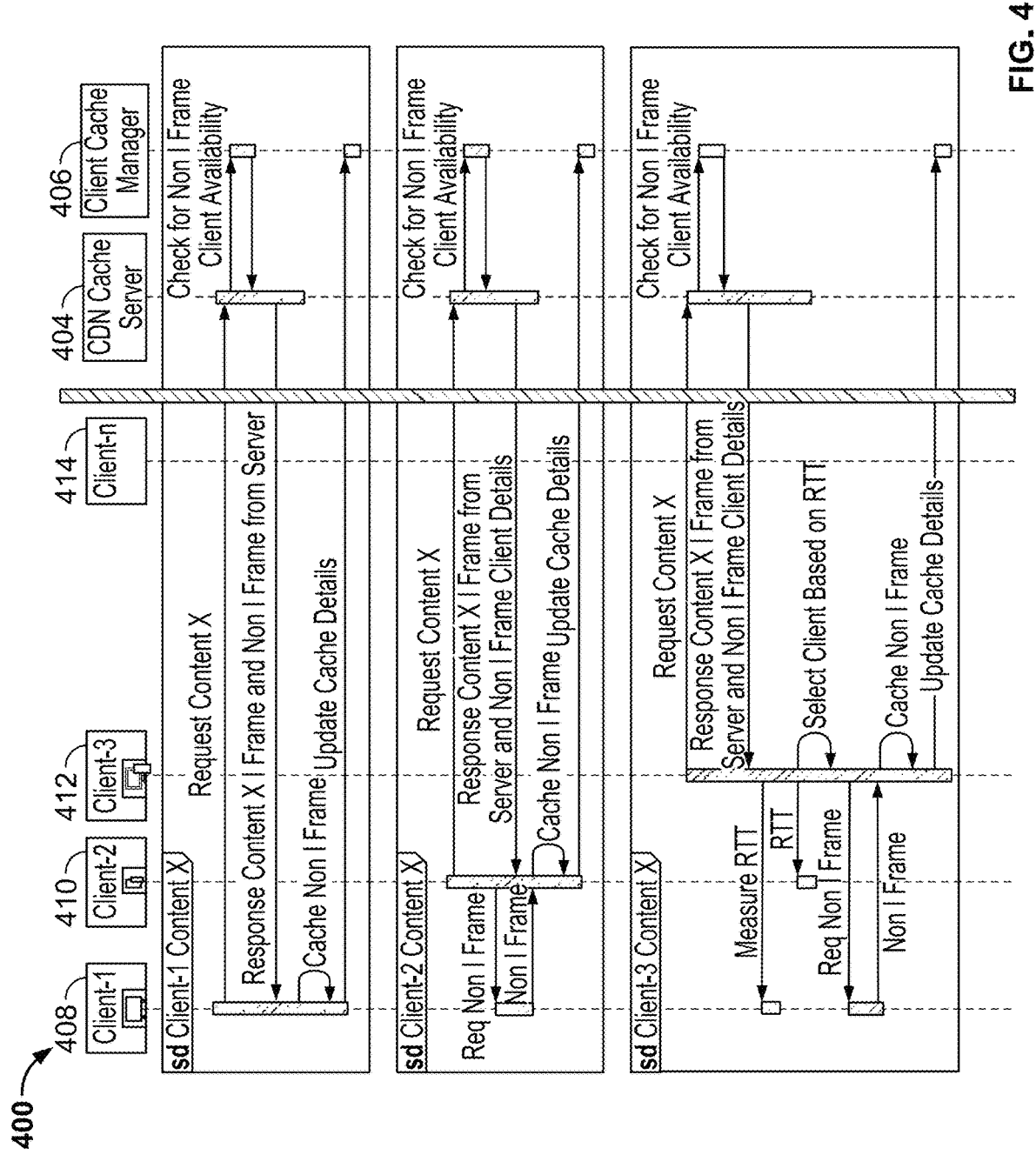
FIG. 4 shows an exemplary timeline between transmitting the first stream and the subsequent stream of content using the CDN cache server, in accordance with some embodiments of the disclosure.

FIG. 4 shows an exemplary timeline between transmitting the first stream and the subsequent stream of content using the CDN cache server, in accordance with some embodiments of the disclosure. FIG. 4 shows CDN cache server 404, which monitors content items as they are delivered to client devices 408, 410, 412, 414. The CDN cache server 404 includes a content cache that may store the non-I-frame cache and I-frame cache for a content item. The CDN cache server 404 also includes a database managed by the client content cache manager 406, which tracks which client 408, 410, 412, 414 has received which content item including the metadata 207 associated with the cache details respective to each client device. The client device is interchangeably used as a user device associated with a user or a client.

In an exemplary scenario, a timeline is presented with a request from first client 408 for a content item from the CDN cache server 404. The CDN determines the availability of the non-I-frame and I-frame segments from the client cache manager 406. When no other client is consuming the content item, the content item is delivered to the first client 408. In another scenario, when a second client 410 requests the same content item, the CDN cache server 404 determines if another user device is consuming the content item, and, if so, the server may transmit instructions to the second client 410. Based on said instructions, the first device may transmit the content item to the second user device. In some embodiments, the CDN edge server transmits from the content cache the I-frame (encrypted) with (DRM) and non-I-frame to the user device at first client 408. The CDN edge server transmits from the content cache the I-frame (encrypted with DRM) and client 1 transmits the non-I-frame to the user device at second client 410 via a communication network between first client 408 and second client 410. The client for transmission of the non-I-frame content item may be identified based on the proximity, bandwidth capacity, an established relationship, or a combination thereof.

In some embodiments, the system selects the client device to provide the non-i-frame content item based on a measured round-trip time (RTT) between the two client devices. For example, the system determines the time it takes for the non-i-frame to be transmitted to the client device and compares it against other client devices. Based on a measured RTT for a plurality of devices, the system may select the client device for transmitting the non-i-frame content with the lowest RTT.

Figure 5:
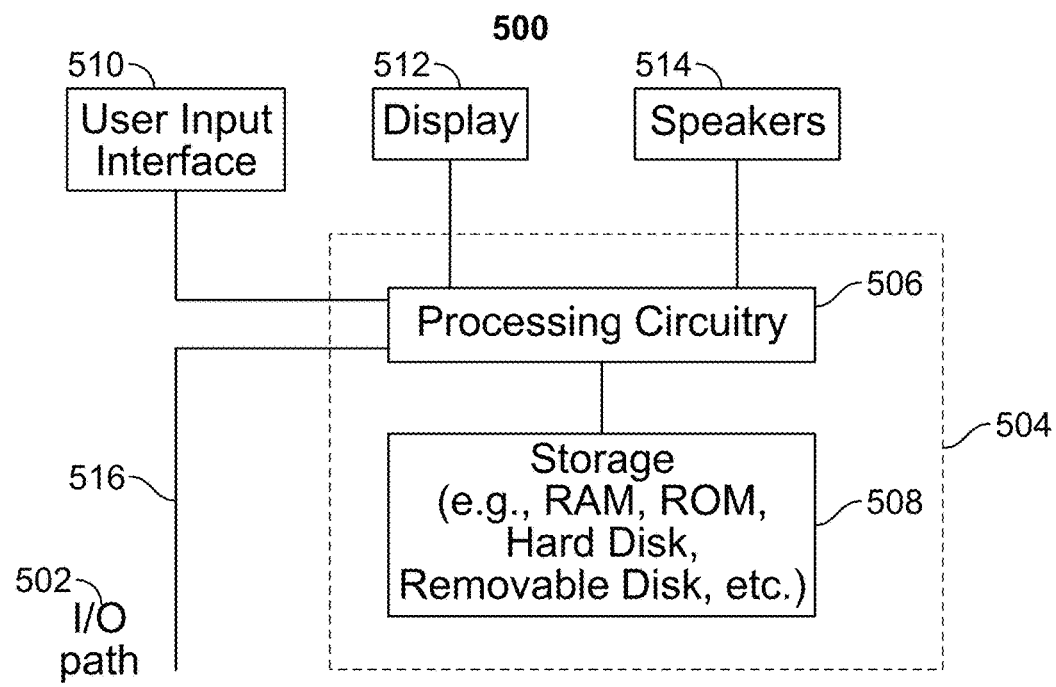
FIG. 5 is a block diagram showing components and data flow therebetween of a system for demultiplexing a media asset and delivering it via multiple delivery protocols, in accordance with some embodiments of the disclosure.

FIG. 5 is a block diagram showing components and data flow therebetween of a system for demultiplexing a media asset and delivering it via multiple delivery protocols, in accordance with some embodiments of the disclosure. Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client/server-based embodiments, control circuitry 504 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media guidance data described above. Nonvolatile memory may also be used (e.g., to launch a boot-up routine and other instructions). Cloud-based storage, described in relation to FIG. 10, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio component may be in the form of a manifest file and may be combined from one or more videos. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client/server-based application. Data for use by a thick or thin client implemented on user equipment device 500 is retrieved on-demand by issuing requests to a server remote to the user equipment device 500. In one example of a client/server-based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
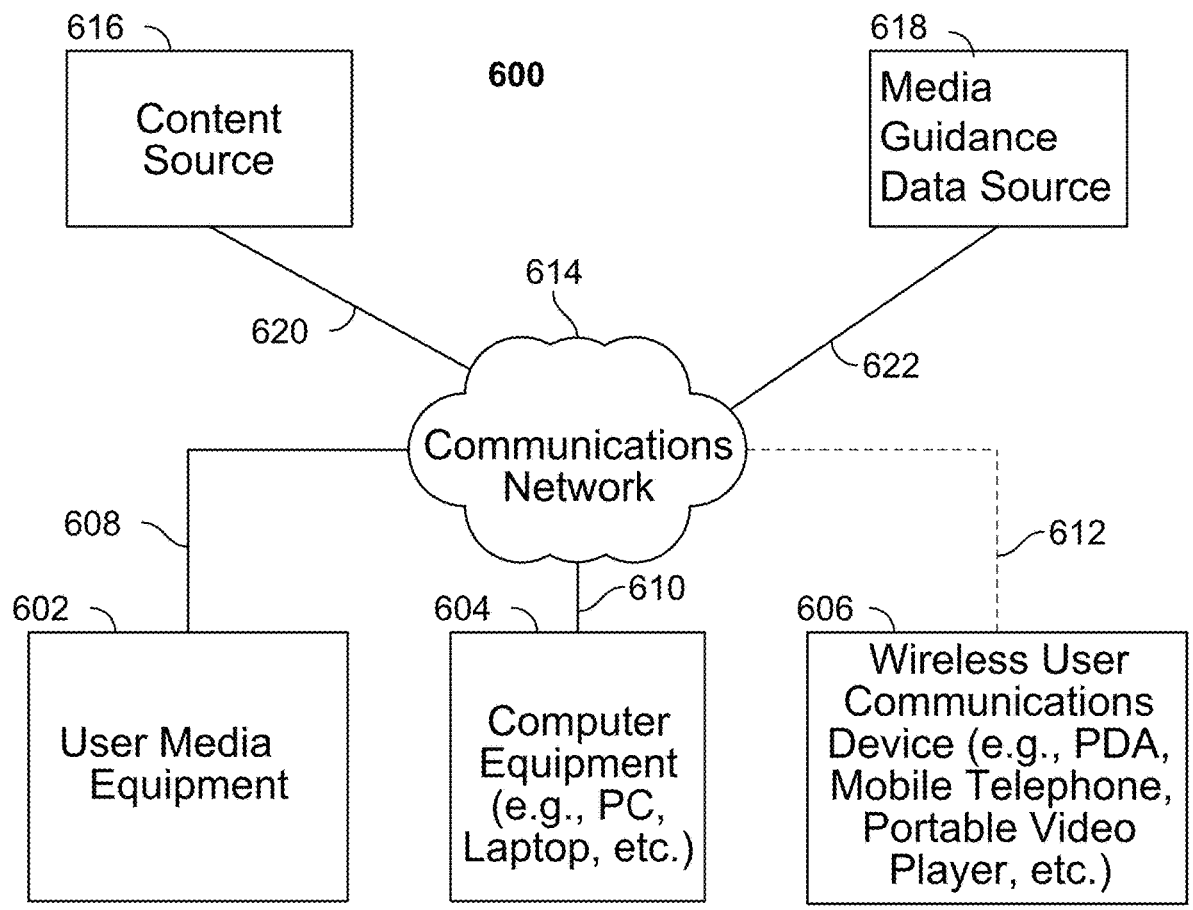
FIG. 6 is a block diagram of an illustrative system for demultiplexing a media asset and delivering it via multiple delivery protocols, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

FIG. 6 is a block diagram of an illustrative system for demultiplexing a media asset and delivering it via multiple delivery protocols, in accordance with some embodiments of the disclosure;

A user equipment device utilizing at least some of the system features described above in connection with FIG. 6 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a website accessed by a web browser. In another example, the guidance application may be scaled down for wireless user communications devices 606.

In system 600, there is typically more than one of each type of user equipment device, but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting the settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications networks or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6, it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 10 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 1020 and 622 may include any of the communication paths described above in connection with paths 608, 610, and 612. Communications with the content source 1016 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client/server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions, which may be stored in storage 508, and executed by control circuitry 54 of a user equipment device 500. In some embodiments, media guidance applications may be client/server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 1018 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches or in a system employing other approaches for delivering content and providing media guidance.

Figure 7:
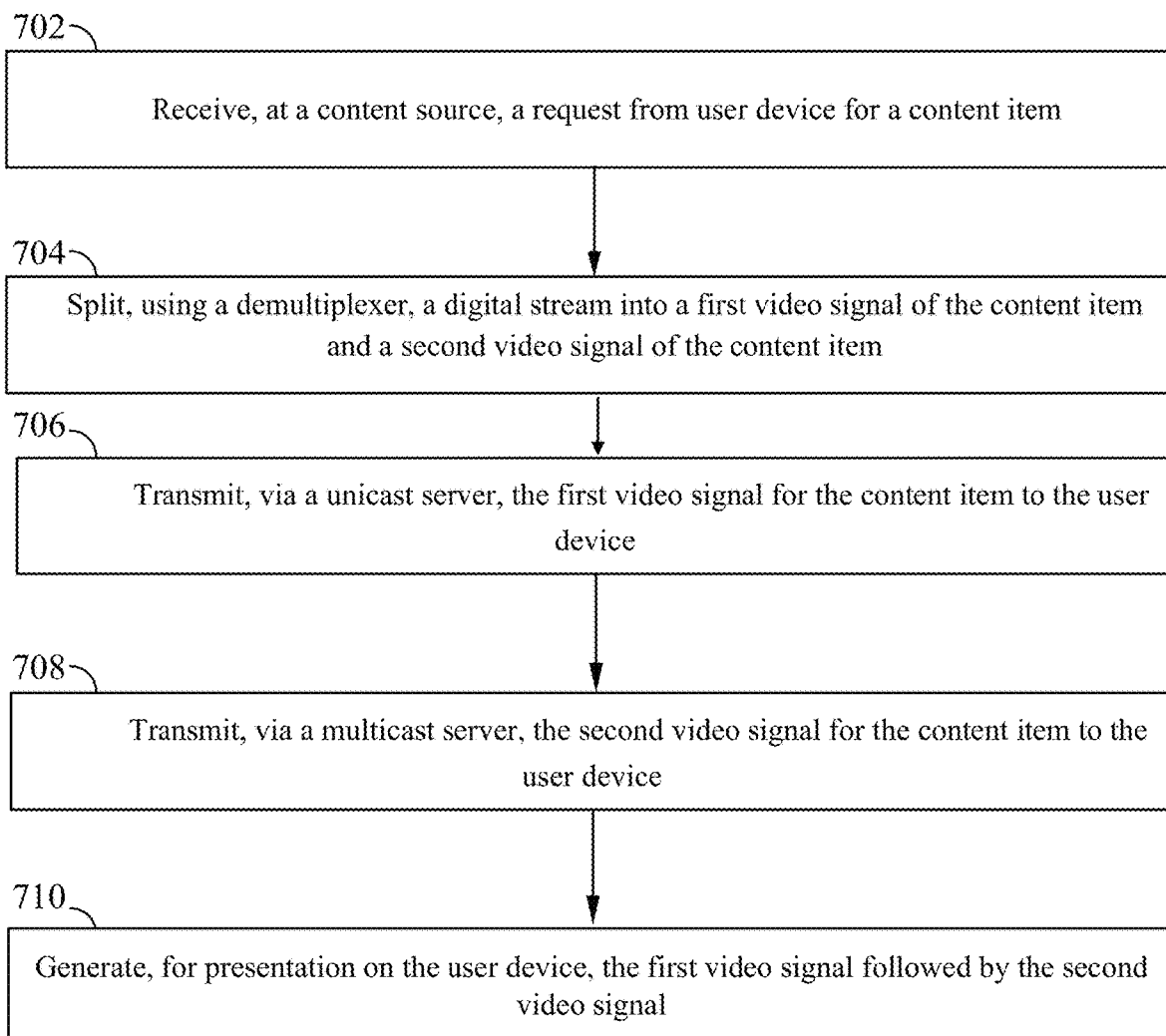
FIG. 7 is a flowchart of an illustrative process in which a media asset is demuxed and delivered via multiple delivery protocols, in accordance with some embodiments of the disclosure.

FIG. 7 is a flowchart representing an illustrative process for delivering a media asset via multiple delivery protocols. The flowchart in FIG. 7 represents a process 700 implemented on control circuitry 504 to generate a playlist from a simultaneous presentation of a plurality of media assets. It should be noted that process 700 or any action thereof could be performed on, or provided by, any of the devices shown in FIGS. 5-6. For example, process 700 may be executed by control circuitry 504 (FIG. 5) as instructed by a media guidance application implemented on a user device (e.g., user equipment devices 602, 604, and/or 606 (FIG. 6) discussed in more detail above) in order to generate a playlist from a simultaneous presentation of a plurality of media assets.

At 702, control circuitry 504 may be configured to receive, at a content source, a request for the content item from a user device. For example, control circuitry 504 may receive a selection to view two different media assets (e.g., a football game and an Olympic event).

At 704, control circuitry 504 may be configured to split, using a demultiplexer, a digital stream into a first video signal of the content item and a second video signal of the content item. For example, control circuitry 504, at the cloud/server level, to improve efficiency and streamline delivery of the content item, may split the content item into two batches, one batch that is easily transmitted to multiple users (e.g., non-I-frames) and one batch that is specific to each user (e.g., I-frame). Based on such a configuration, without both batches of files at the user device, the content item cannot be consumed, because one batch only transmits a first frame (image) and the second transmission only transmits updates to the image (non-I-frame) segments. By splitting the content into these batches, the combined delivery relieves bandwidth capacity at the server lever and thereby improves machine functionality.

At 706, control circuitry 504 may be configured to transmit, via a unicast server, the first video signal for the content item to the user device. In some embodiments, the control circuitry may be configured to transmit using a singular delivery protocol. Based on the first video signal being transmitted to the user device 126, the user device may store the video signal in a cache and generate for presentation the content item based on a timeline and/or availability of the second video signal.

At 708, control circuitry 504 may be configured to transmit, via a multicast server, the second video signal for the content item to the user device 126. In some embodiments, the control circuitry may be configured to transmit using a multicast or a different delivery protocol. Based on the second video signal being transmitted to the user device 126, the user device may store the second video signal in a cache and delay the presentation of the content until the first video signal is generated on the display.

At 710, control circuitry 504 may be configured to generate, for presentation on the user device, the first video signal followed by the second video signal. For example, control circuitry 504 may generate for a television the first video signal (I-frame), followed by the second video signal (non-I-frame). That is, as the user is consuming a single content item, it switches between frames delivered from the unicast mechanism to a multicast mechanism. This way, the servers delivering the content item may alleviate bandwidth from the unicast server, which delivers individual packets of the media asset, to delivering packets from multicast mechanisms that are delivered to multiple devices.

The actions and descriptions of FIG. 7 may be used with any other embodiment of this disclosure. In addition, the actions and descriptions described in relation to FIG. 7 may be done in suitable alternative orders or in parallel to further the purposes of this disclosure. Any of these actions may also be skipped or omitted from the process. Furthermore, it should be noted that any of the devices or equipment discussed in relation to FIGS. 5-6 could be used to perform one or more of the actions in FIG. 7.

Figure 8:
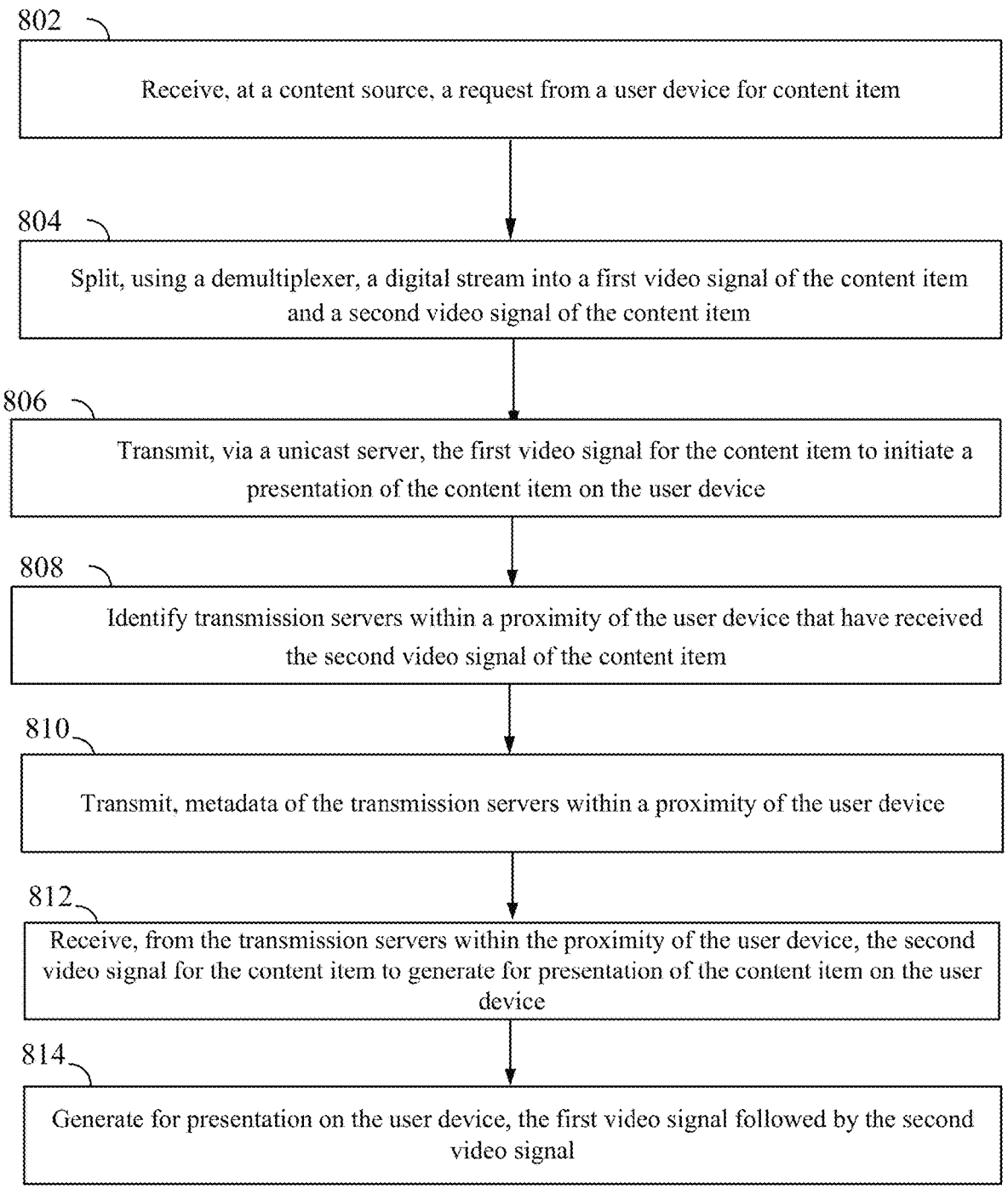
FIG. 8 is another flowchart of an illustrative process in a media asset is demuxed and delivered via multiple delivery protocols, in accordance with some embodiments of the disclosure.

FIG. 8 is a flowchart representing an illustrative process for dynamically optimizing the delivery of a content item to a user device. The flowchart in FIG. 8 represents a process 800 implemented on control circuitry 504 to transmit a first video segment to a user device using a unicast transmission and identify a peer device for transmitting a second video segment to the user device. It should be noted that process 800 or any action thereof could be performed on, or provided by, any of the devices shown in FIGS. 5-6. For example, process 800 may be executed by control circuitry 504 (FIG. 5) as instructed by a media guidance application implemented on a user device (e.g., user equipment devices 602, 604, and/or 606 (FIG. 6) discussed in more detail above) in order to dynamically optimize the delivery of a content item to a user device.

At 802, control circuitry 504 may be configured to receive, at a content source, a request for the content item from the user device. For example, control circuitry 504 may receive a selection to view two different media assets (e.g., a football game and an Olympic event).

At 804, control circuitry 504 may be configured to split, using a demultiplexer, a digital stream into a first video signal of the content item and a second video signal of the content item. For example, control circuitry 504, at the cloud/server level, to improve efficiency and streamline delivery of the content item, may split the content item into two batches, one batch that is easily transmitted to multiple users (e.g., non-I-frame) and one batch (e.g., I-frame) that is specific to each user. Based on such a configuration, without both batches of files at the user device, the content item cannot be consumed because one batch only transmits a first frame (image) and the second transmission only transmits updates to the image (non-I-frame) segment. By splitting the content into these batches, the combined delivery relieves bandwidth capacity at the server lever, thereby improving machine functionality.

At 806, control circuitry 504 may be configured to transmit, via a unicast server, the first video signal for the content item to the user device. In some embodiments, the control circuitry may be configured to transmit using a singular delivery protocol. Based on the first video signal being transmitted to the user device 126, the user device may store the video signal in a cache and generate for presentation the content item based on a timeline and/or availability of the second video signal.

At 808, control circuitry 504 may be configured to identify transmission servers within proximity of the user device that have received the content item's second video signal. For example, a client content cache manager may evaluate client devices that have recently received the content item to determine the information of the client devices and whether they are available for transmitting the video stream to the user device. The system may instruct the user device to receive the content item from a client device. In some embodiments, the request to transmit the content item segment is transmitted from the server system. For example, as the user desires to watch a show on the personal device, the system transmits the first image with the appropriate encryption and DRM keys and the subsequent stream of content is received from a neighbor or a local server with available bandwidth.

At 810, control circuitry 504 may be configured to transmit metadata of the transmission servers within proximity of the user device. For example, control circuitry 504 may access metadata stored in a database pertaining to the client devices that have recently received the content item and still have it cached in their storage, including the general proximity of each device to the user device. In some embodiments, the control circuitry 504 may measure the RTT for a plurality of client devices that may transmit the content item and may transmit this information to the user device. For security purposes, some information regarding each client device and the location of the device may be hidden from the user device to provide privacy. Also, in some embodiments, the content item may undergo verification to ensure that no viruses are on the device.

At 812, control circuitry 904 may be configured to receive, from the transmission servers within the proximity of the user device, the second video signal for the content item to generate for presentation of the content item on the user device. The control circuitry may be configured to transmit the second video signal from the client device to the user device using a multicast or a different delivery protocol in some embodiments. Based on the second video signal being transmitted to the user device 126, the user device may store the video signal in a cache and delay the presentation of the content until the first video signal is generated on the display.

At 814, control circuitry 504 may be configured to generate, for presentation on the user device, the first video signal followed by the second video signal. For example, control circuitry 504 may instruct the user device 126 to display a first video signal from the unicast transmission and transmit the second video signal from the peer-to-peer transmission. Depending on the configuration of control circuitry 504, an alert displayed on the user device 126 may include an option to receive the video signal from a local transmission from another device. Control circuitry 504 may, alternatively or additionally, include an option in the alert to pause the content item. The alert may also include an option to dismiss the alert without taking any action.

The actions and descriptions of FIG. 8 may be used with any other embodiment of this disclosure. In addition, the actions and descriptions described in relation to FIG. 8 may be done in suitable alternative orders or in parallel to further the purposes of this disclosure. Any of these actions may also be skipped or omitted from the process. Furthermore, it should be noted that any of the devices or equipment discussed in relation to FIGS. 5-6 could be used to perform one or more of the actions in FIG. 8.

Figure 9:
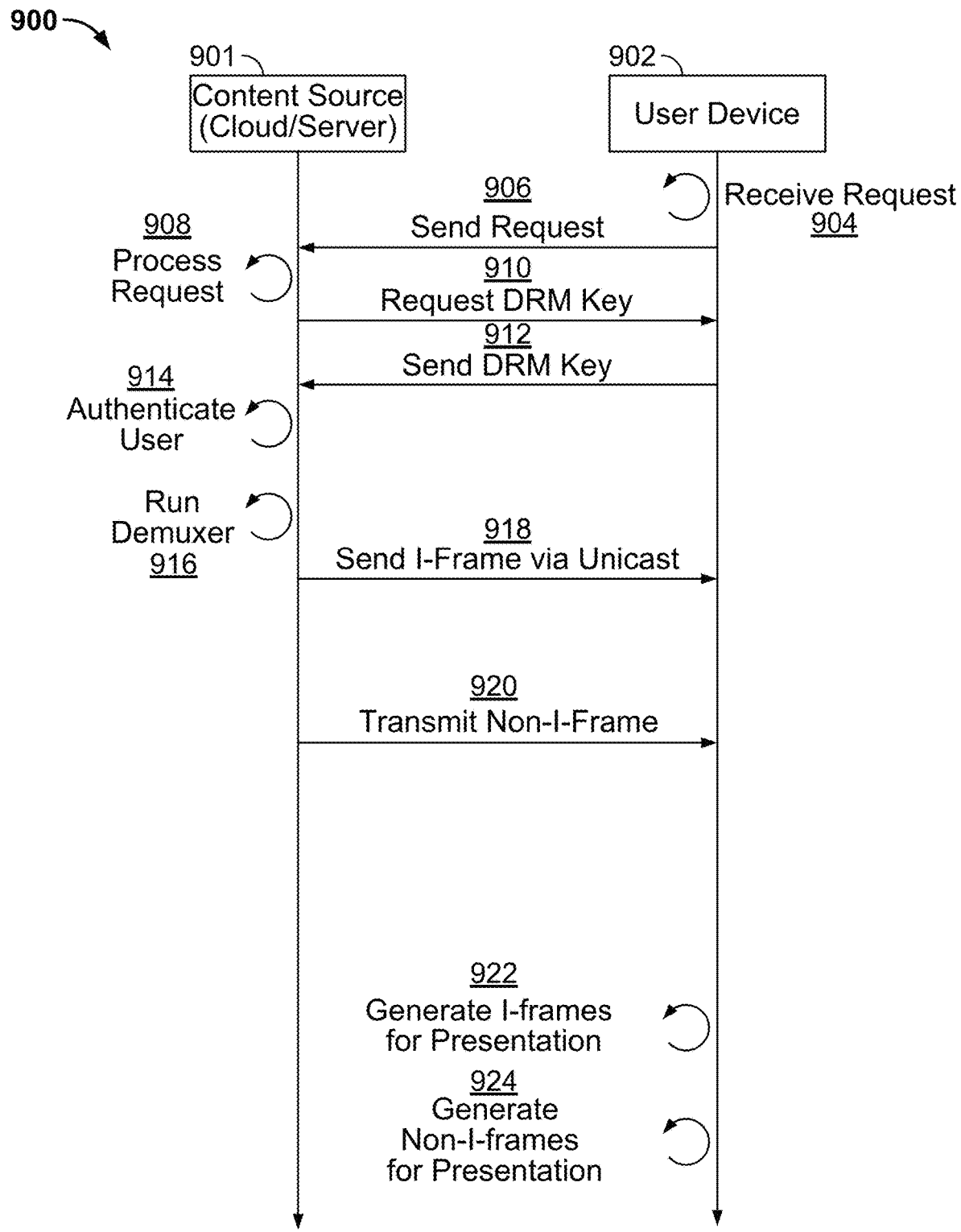
FIG. 9 is a flowchart of a detailed illustrative process for transmitting a content item to a user device from a content source using multiple protocols, in accordance with some embodiments of the present disclosure.

FIG. 9 shows a processing flow 900 for transmitting a content item from a content source 901 using multiple protocols to a user device 902, in accordance with some embodiments of this present disclosure. It should be noted that process 900 or any step thereof could be performed on, or provided by, the system of FIGS. 5 and 6 or any of the devices shown in FIGS. 1 and 3. In some embodiments, the steps of process 900 are performed as described in the discussion of FIG. 1. For example, process 900 may be executed by devices 602, 604, 606, 616 or 618 (e.g., via control circuitry 504) and/or control circuitry of the transmission source, as instructed by an authentication application that may be implemented on the user device 902 and/or content source 901, such as to deliver a content item from a server to a user device using multiple delivery protocols. In addition, one or more steps of process 900 may be incorporated into or combined with one or more steps of any other process or embodiment (e.g., process 1000 of FIG. 10, or process 1100 of FIG. 11).

At 904, the control circuitry of a user device 902 (e.g., user interface or a remote of user device 126 of FIG. 1) may request a content item for presentation on the user device via a communication network (e.g., communication network 614 of FIG. 6).

At 906, the user device 902 sends the request to a content source 901 via a communication network (e.g., communication network 614 of FIG. 6), and, at 908, the content source 901 processes the request. For example, content source 901 will evaluate the request and confirm that the content source can transmit the content item.

At 910, the control circuitry sends a request for a digital rights management key to a user device 902 via a communication network (e.g., communication network 614 of FIG. 6). For example, the content source may request user data for authentication. The user device 902 at 912 may provide the DRM key to the content source 901. At 914, the control circuitry of the content source 901 authenticates the user associated with the user device. In some embodiments, the content source 901 performs the authentication of the user by providing a DRM key to the user device, and the authentication is performed at the user device.

At 916, the control circuitry of the content source may run a demuxer to demultiplex the content item into smaller segments. For example, the demuxer separates the content item into a first video segment and a second video segment. In some embodiments, the demuxer separates the content item into I-frame and non-I-frame segments. The steps of 918 and 920 may be performed in sequence, simultaneously or in reverse order. At 918, the control circuitry of the content source 901 transmits the first video signal to the user device 902. In some embodiments, the control circuitry sends I-frame segments to the user device. At 920, the control circuitry of the content source 901 transmits the second video signal to the user device 902. In some embodiments, the control circuitry sends non-I-frame segments to the user device 902.

At 922, the control circuitry of the user device 902 may generate the I-frames for presentation on the user device, and, at 924, the control circuitry of the user device 902 may generate the non-I-frames for presentation on the user device. The steps of 922 and 924 may be performed in sequence. At this point, the content item is presented on the display: parts of the content item are received using unicast transmission, and parts of the content item are transmitted using the multicast transmission.

Figure 10:
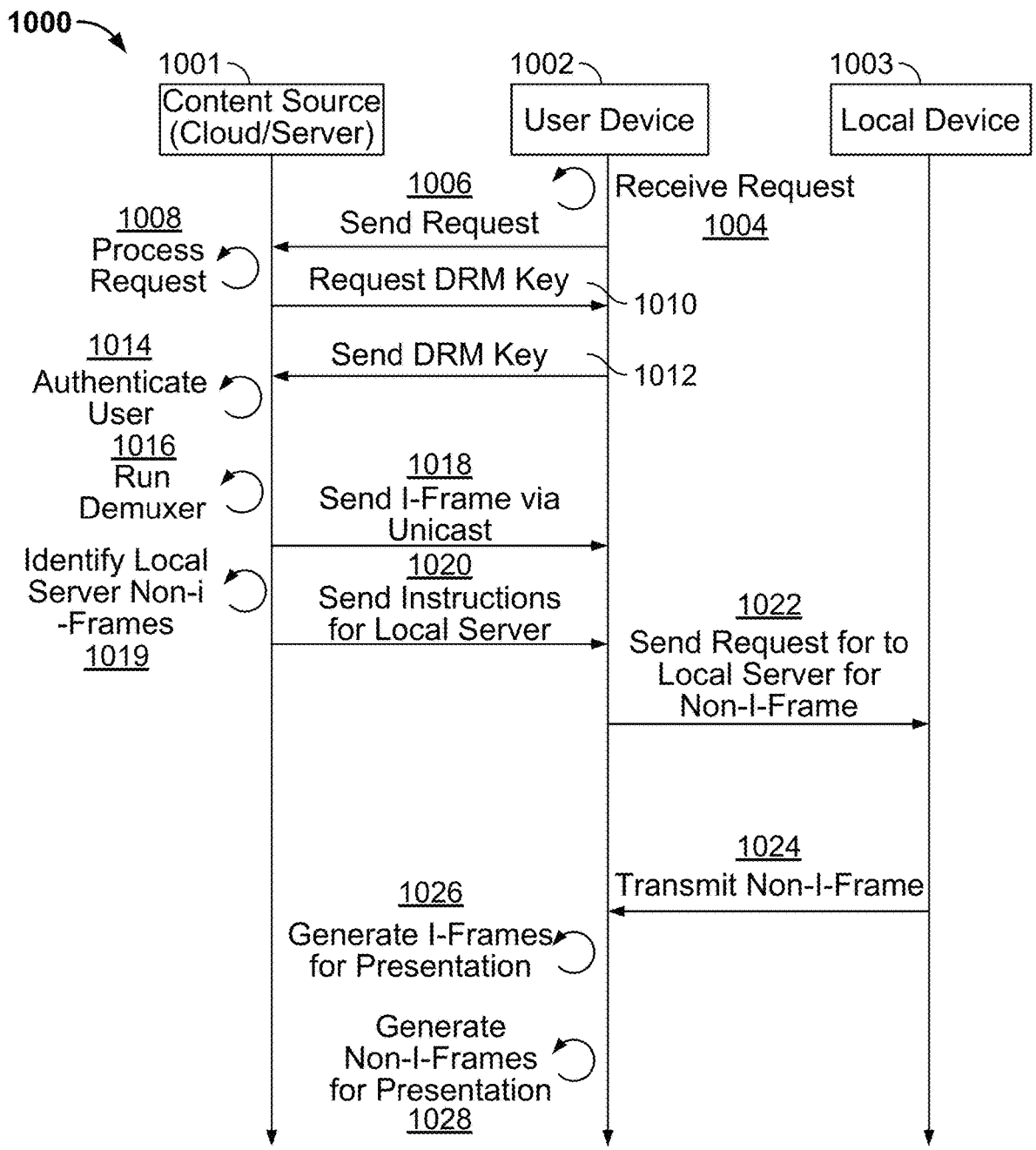
FIG. 10 is a flowchart of a detailed illustrative process for transmitting a content item to a user device from a content source using a unicast server and a multicast server, in accordance with some embodiments of the present disclosure.

FIG. 10 shows a processing flow 1000 for transmitting a content item from a content source 1001 and a local device (e.g., local user, a neighbor, or another device near the user device) 1003, using multiple protocols, to a user device 1002, in accordance with some embodiments of this present disclosure. It should be noted that process 1000 or any step thereof could be performed on, or provided by, the system of FIGS. 5 and 6 or any of the devices shown in FIGS. 1 and 3. In some embodiments, the steps of process 1000 are performed as described in the discussion of FIG. 1. For example, process 1000 may be executed by devices 602, 604, 606, 616 or 618 (e.g., via control circuitry 504) and/or control circuitry of the transmission source, as instructed by an authentication application, which may be implemented on the user device 1002, and/or content source 1001, so as to deliver a content item from a number of servers to a user device 1002 using multiple delivery protocols. In addition, one or more steps of process 1000 may be incorporated into or combined with one or more steps of any other process or embodiment (e.g., process 900 of FIG. 9, or process 1100 of FIG. 11).

At 1001, the control circuitry of a user device 1002 (e.g., user interface or a remote of user device 126 of FIG. 1) may request a content item for presentation on the user device via a communication network (e.g., communication network 614 of FIG. 6).

At 1006, the user device 1002 sends the request to a content source 1001 via a communication network (e.g., communication network 614 of FIG. 6), and, at 1008, the content source 1001 processes the request. For example, content source 1001 will evaluate the request and confirm that the content source can transmit the content item.

At 1010, the control circuitry sends a request for a digital rights management key to a user device 1002 via a communication network (e.g., communication network 614 of FIG. 6). For example, the content source may request user data for authentication. The user device 1002 at 1012 may provide the DRM key to the content source 1001. At 1014, the control circuitry of the content source 1001 authenticates the user associated with user device 1002. In some embodiments, the content source 1001 performs the authentication of the user by providing a DRM key to the user device, and the authentication is performed at the user device.

At 1016, the control circuitry of the content source may run a demuxer to demultiplex the content item into smaller segments. For example, the demuxer separates the content item into a first video segment and a second video segment. In some embodiments, the demuxer separates the content item into I-frame and non-I-frame segments. The steps of 1018 and 1019 may be performed in sequence, simultaneously or in reverse order. At 1018, the control circuitry of the content source 1001 transmits the first video signal to the user device 1002. In some embodiments, the control circuitry sends I-frame segments to the user device. At 1019, the control circuitry of the content source 1001 identifies local servers that contain (e.g., cache) the second video signal of the content item. In some embodiments, the control circuitry, which has viewed the content item, searches the clients' database using the content client cache manager 406 of FIG. 4. At 1020, the control circuitry of the content source 1001 transmits instructions to the user device 1002 of the location of the second video signal for the content item. In some embodiments, the control circuitry sends instructions to the user device 1002 of where the non-I-frame segments are located. In some embodiments, the control circuitry directly transmits a request for the second video signal from the local server 1003.

At 1022, the control circuitry of the user device 1002 sends a request for the non-I-frames to the local server 1003. In response to sending the request for the non-I-frames, at 1024, the local server 1003 transmits to the user device 1002 the non-I-frames. At 1026, the control circuitry of the user device 1002 may generate the non-I-frames for presentation on the user device. The steps of 1026 and 1028 may be performed in sequence. At this point, the content item is presented on the display: parts of the content item are received using unicast transmission, and parts of the content item are transmitted from a local server or device using the peer-to-peer transmission. In some embodiments, the peer-to-peer transmission may be any type of transmission protocol.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

As used herein, a "portion" may be a "segment" of a media asset, or any other part of the media asset that represents, contains, or comprises less data than that of the media asset as a whole. A "segment" may comprise a number of seconds of media content for output on the client device, and may be the minimum unit of media that can be played back by the client device 126. For example, a segment may comprise five seconds of audio and video data representing a five-second portion of the media asset.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a web site, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology is included in the definition of medium. Combinations of media are also included within the scope of computer-readable media.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for transmitting a content item to a user device, the method comprising:
receiving, at a content source, a request for the content item from the user device;
splitting, using a demultiplexer, a digital stream into a first video signal of the content item and a second video signal of the content item;
transmitting, via a unicast server using a first delivery protocol, the first video signal for the content item to the user device;
transmitting, via a multicast server using a second delivery protocol, the second video signal for the content item to the user device;
generating for presentation on the user device the first video signal followed by the second video signal;
during presentation of the content item on the user device:

receiving, from the user device, a sequence of intraframe and non-intraframe segments based on presentation of the content item on the user device;
receiving messages associated with each segment of the sequence as the sequence is presented on the user device;
determining, based on the messages, out-of-order messages indicative of delivery of the content item for the user device being behind; and
based on the out-of-order messages indicative of delivery of the content item for the user device being behind, switching from transmitting the first video signal via the unicast server using the first delivery protocol to transmitting the first video signal via a server that uses a third delivery protocol different from the first delivery protocol and the second delivery protocol.

2. The method of claim 1, wherein the transmitting, via the unicast server, the first video signal for the content item comprises transmitting the first video signal encrypted with a digital right management (DRM) for the content item.

3. The method of claim 1, wherein the transmitting, via the multicast server, the second video signal for the content item comprises transmitting an unencrypted second video signal for the content item.

4. The method of claim 1, wherein generating, for presentation on the user device, the first video signal followed by the second video signal comprises switching from generating for presentation the first video signal to generating for presentation the second video signal on the user device.

5. The method of claim 1, wherein transmitting, via the unicast server, the first video signal comprises delivering the first video signal as a unicast over-the-top (OTT) stream to the user device over a cellular network.

6. The method of claim 1, wherein transmitting, via the multicast server, the second video signal comprises delivering the second video signal as a multicast over-the-top (OTT) stream to the user device over a cellular network.

7. The method of claim 1, wherein the second video signal for the content item is cached at a content distribution network (CDN) for transmission via the multicast server.

8. The method of claim 1, wherein the third delivery protocol has a lower overhead than the first delivery protocol.

9. The method of claim 1, wherein the first video signal comprises intraframe segments of the content item, and wherein the second video signal consists of non-intraframe segments of the content item.

10. The method of claim 1, further comprising:
receiving, from the user device, a number of out-of-order messages; and
receiving, from the user device, a request for retransmission of non-intraframe segments based on the number of out-of-order messages.

11. A system for transmitting a content item to a user device, the system comprising:
a communications circuitry configured to receive and transmit data; and
a control circuitry configured to:
receive, at a content source via the communications circuitry, a request for the content item from the user device;
split, using a demultiplexer, a digital stream into a first video signal of the content item and a second video signal of the content item;
transmit via a unicast server using a first delivery protocol, the first video signal for the content item to the user device;
transmit via a multicast server using a second delivery protocol, the second video signal for the content item to the user device;
generate for presentation on the user device, the first video signal followed by the second video signal;
during presentation of the content item on the user device:
receive, from the user device via the communications circuitry, a sequence of intraframe and non-intraframe segments based on presentation of the content item on the user device;
receive, via the communications circuitry, messages associated with each segment of the sequence as the sequence is presented on the user device;
determine, based on the messages, out-of-order messages indicative of delivery of the content item for the user device being behind; and
based on the out-of-order messages indicative of delivery of the content item for the user device being behind, switch from transmitting the first video signal via the unicast server using the first delivery protocol to transmitting the first video signal via a server that uses a third delivery protocol different from the first delivery protocol and the second delivery protocol.

12. The system of claim 11, wherein the control circuitry is further configured to transmit, via the unicast server, the first video signal for the content item by transmitting the first video signal encrypted with a digital right management (DRM) for the content item.

13. The system of claim 11, wherein the control circuitry is further configured to transmit, via the multicast server, the second video signal for the content item by transmitting an unencrypted second video signal for the content item.

14. The system of claim 11, wherein the control circuitry is further configured to generate, for presentation on the user device, the first video signal followed by the second video signal by switching from generating for presentation the first video signal to generating for presentation the second video signal on the user device.

15. The system of claim 11, wherein the control circuitry is further configured to transmit, via the unicast server, the first video signal by delivering the first video signal as a unicast over-the-top (OTT) stream to the user device over a cellular network.

16. The system of claim 11, wherein the control circuitry is further configured to transmit, via the multicast server, the second video signal by delivering the second video signal as a multicast over-the-top (OTT) stream to the user device over a cellular network.

17. The system of claim 11, wherein the second video signal for the content item is cached at a content distribution network (CDN) for transmission via the multicast server.

18. The system of claim 11, wherein the third delivery protocol has a lower overhead than the first delivery protocol.

19. The system of claim 11, wherein the first video signal comprises intraframe segments of the content item, and wherein the second video signal consists of non-intraframe segments of the content item.

20. The system of claim 11, wherein the control circuitry is further configured to:
receive, from the user device, a number of out-of-order messages; and receive, from the user device, a request for retransmission of non-intraframe segments based on the number of out-of-order messages.

\* \* \* \* \*